United States Patent [19]
Ranalli et al.

[11] Patent Number: 5,790,639
[45] Date of Patent: Aug. 4, 1998

[54] METHOD AND APPARATUS FOR AUTOMATICALLY SENDING AND RECEIVING MODIFIABLE ACTION REPORTS VIA E-MAIL

[75] Inventors: Douglas J. Ranalli, Cambridge; Thomas P. Sosnowski, Wayland; Robert Huebner, Topsfield, all of Mass.

[73] Assignee: Unifi Communications, Inc., Lowell, Mass.

[21] Appl. No.: 797,821

[22] Filed: Feb. 10, 1997

[51] Int. Cl.$^6$ ............................................. H04M 11/00
[52] U.S. Cl. ................... 379/100.08; 379/100.06; 358/407; 358/434
[58] Field of Search .......... 379/100.01, 100.02–100.09, 379/102.01, 102.02; 358/400, 402, 403, 407, 434–436, 438, 440, 468

[56] References Cited

U.S. PATENT DOCUMENTS 5,404,231  4/1995  Bloomfield ............................ 358/407

Primary Examiner—Wing F. Chan
Attorney, Agent, or Firm—Wolf, Greenfield & Sacks, P.C.

[57] ABSTRACT

A method and apparatus for assisting delivery of fax documents over a value-added network, such as a store-and-forward network. If an initial delivery attempt is unsuccessful, the network automatically sends an e-mail to the sender of the fax document indicating the status of the fax delivery and reasons for the document's non-delivery. The sender of the fax is prompted to choose from selectable options included in the e-mail which provide instructions to resolve the delivery problem. Upon receipt of an e-mail response, the network automatically decodes the selected options and uses the chosen options to resend the fax document and automatically resolve the delivery problem.

16 Claims, 6 Drawing Sheets

---

Fax International
Action Report Delivered by E-Mail

Please Note: Your fax document

102 — Sent to: 1-555-8999   at   Time: 10:17 PM   Date: Sat 01/11/97

Status: Undeliverable   Reason: Machine does not answer call

Please Select One of the Following Options for a New Delivery Attempt   103

*Suggestion: Typically, a machine does not answer a call because it is out of paper. Suggest you reschedule delivery for next business day: Monday, Jan 13 at 9 AM.*   105

104 {
Retry Same Number:   ___
Incorrect Number:   ___        Enter New Number: _-___-____
Alternate Number: ___          Enter New Number: _-___-____
Reschedule Delivery:   ___     Enter New Delivery Date: __/__/__
Accept Suggestion:   ___       Enter New Delivery Time: __:__

If you accepted the Suggested Solution, would you like it to be applied automatically to this problem if it occurs on future calls to this number?

YES ___   NO ___   Please Call to Discuss ___

Fax International
Action Report Delivered by E-Mail

Please Note: Your fax document

Sent to: 1-555-8999   at   Time: 10:17 PM   Date: Sat 01/11/97

Status: Undeliverable   Reason: Machine does not answer call

Please Select One of the Following Options for a New Delivery Attempt

*Suggestion:* Typically, a machine does not answer a call because it is out of paper. Suggest you reschedule delivery for next business day: Monday, Jan 13 at 9 AM.

Retry Same Number: ___
Incorrect Number: ___   Enter New Number: ___
Alternate Number: ___   Enter New Number: ___
Reschedule Delivery: ___   Enter New Delivery Date: __/__/__
Accept Suggestion: ___   Enter New Delivery Time: __:__

If you accepted the Suggested Solution, would you like it to be applied automatically to this problem if it occurs on future calls to this number?

YES ___   NO ___   Please Call to Discuss ___

Fig. 3A

Fax International
Action Report Delivered by E-Mail

Please Note: Your fax document

Sent to: 1-555-8999 at Time: 10:17 PM Date: Sat 01/11/97

Status: Undeliverable Reason: Machine does not answer call

Please Select One of the Following Options for a New Delivery Attempt

*Suggestion: Typically, a machine does not answer a call because it is out of paper. Suggest you reschedule delivery for next business day: Monday, Jan 13 at 9 AM.*

Retry Same Number: ___
Incorrect Number: ___ Enter New Number: _-___-____
Alternate Number: ___ Enter New Number: _-___-____
Reschedule Delivery: ___ Enter New Delivery Date: __/__/__
Accept Suggestion: _X_ Enter New Delivery Time: __:__

If you accepted the Suggested Solution, would you like it to be applied automatically to this problem if it occurs on future calls to this number?

YES _X_   NO ___   Please Call to Discuss ___

Fig. 3B

METHOD AND APPARATUS FOR AUTOMATICALLY SENDING AND RECEIVING MODIFIABLE ACTION REPORTS VIA E-MAIL

FIELD OF THE INVENTION

The present invention concerns delivery of facsimile (fax) documents over a value-added network, such as a store-and-forward network, and more particularly to a method and apparatus for automatically sending an action report via electronic mail (e-mail) and automatically utilizing an e-mail response to resolve problems encountered while delivering a fax document.

BACKGROUND OF THE INVENTION

As a mechanism to carry information over long distances, store-and-forward (S&F) networks offer an efficient, low-cost alternative to the existing public switched telephone network (PSTN). In general, S&F networks operate parallel to, and are accessed by, the PSTN.

FIG. 1 shows schematically PSTN 30 and S&F network 80 connected in parallel between a source fax machine 10 and a destination fax machine 70. An autodialer 12, positioned between the source fax machine 10 and PSTN 30, designates incoming faxes for transmission over either the PSTN 30 or S&F network 80. If, for example, the destination of the incoming fax is not one serviced by the S&F network 80, then the autodialer dials the destination fax number directly to the local exchange 32; the call is then carried in a normal fashion by the PSTN 30 to the destination fax machine 70. In contrast, if the number is one serviced by the S&F network 80, the autodialer 12 dials the telephone number corresponding to that of the source network node 20. The local exchange 32 then routes the call through the PSTN 30 to the source node 20. (Note that, depending upon their proximity, the source fax machine 10 and the source network node 20 may be served by the same or different local exchanges.) Once it has completely received the document, the source node 20 transfers it to the destination network node 40 over dedicated circuits 60. At this point, the destination node 40 dials the destination fax number to its local exchange 36 which in turn transfers the call via the PSTN 30 to the destination fax machine 70. (Note again that, depending upon their proximity, the destination fax machine 70 and the destination network node 40 may be served by the same or different local exchanges.)

In summary, transport of information from the source fax machine 10 to the destination fax machine 70 using the S&F network 80 requires three distinct steps:

(1) Transmission from the source fax machine 10 to the source network node 20 via the PSTN 30;

(2) Transmission from the source node 20 to the destination node 40 via dedicated circuits 60; and (3) Transmission from the destination node 40 to the destination fax machine 70, again via the PSTN 30.

Store-and-forward networks offer a number of significant advantages over standard telephone networks for transport of facsimile. For example, a fax document can be carried much more efficiently using the packet technology employed by S&F networks. Another advantage of using an S&F network is guaranteed availability. A common annoyance in telephony is the inability to complete a call, usually because the destination device is busy or does not answer. Voice mail systems have been designed to overcome this problem in voice telephony, but a similar practical and cost effective solution does not exist for fax over the PSTN.

However, S&F networks offer a viable solution—the S&F network employs a sufficiently large number of telephone circuits such that a customer fax machine never encounters a busy signal. Further, at the destination end, the S&F network has the ability to automatically redial those call attempts which encounter a "busy" or "no-answer" signal. Typically, the calls are redialed periodically over a fixed interval of time, e.g., every ten minutes for a half hour.

Although exceedingly useful when busy signals are encountered, the automatic redial capability is of limited utility in redressing other call completion failures. Other more costly procedures for resolving delivery problems on an S&F network, which require an understanding of document flow through the network, are described below.

Multiple documents are typically coursing through the S&F network at any point in time, and therefore it is important to have some mechanism to monitor the location and status of each. For example, in one known S&F network, a small data file called an envelope is created to track each fax document as it moves through the network. The source node creates the envelope as it receives an incoming fax document. As the fax document moves through the delivery process, the envelope moves among the network devices and is continually updated with the status of the fax. At the termination of the delivery process the destination network node declares the fax document either "delivered" or "not delivered", and records the status in the corresponding envelope which is then returned to the source node.

A special process within the destination node monitors the progress of each call, and duly notes the reason for each failed delivery attempt. The process monitors what are commonly referred to as "call progress features", e.g., busy signals (indicating a busy station set), fast busy (indicating a busy circuit), ringback with no answer, a voice answer indicating a non-working number, a voice answer indicating a disconnected number, etc. The process is also able to detect a variety of responses once the called station goes off hook, including a large number of fax machine failure modes. After a predetermined number of call attempts, if there is no success, the envelope is marked accordingly and returned to the source node.

The source node evaluates each envelope received from the destination node. If the delivery was successful, the envelope is forwarded to a historical database (HD) 54 (see FIG. 2) which provides a basis for constructing customer bills. If the delivery was not successful, the envelope is forwarded to a delivery assist system (DAS) 56 for further processing. DAS has two elements which work in tandem to enable delivery of a fax document: a delivery expert system (DES) 57 and a delivery analysis center (DAC) 58. DES is a rule-based engine which draws upon a large database 59 of information (also contained within DAS) including known fax delivery obstacles, alternative fax delivery numbers, individual customer's faxing preferences, and so forth. DES is used to automatically resolve the majority of undelivered document problems. The customer specific-information is usually gathered at the time the customer initiates the service. Additional information is obtained as a result of ongoing efforts to resolve fax delivery problems, as will become evident. In the event that DES fails to resolve a delivery problem, this fact along with all relevant background information is relayed to DAC 58 where a person experienced in such matters now assumes responsibility for the document.

Often, DES 57 fails in its task because of inadequate information in the DAS database 59. In such cases, the delivery analyst will normally attempt to acquire this information by calling a person at the destination. The analyst then determines a strategy for document delivery. Note that while this prior art method enables the network provider to deliver most fax documents, and provide the customer with an on-going report on alternative delivery attempts, the cost of providing such a service is substantial. Furthermore, the determination of a strategy by the human analyst may take significant time and is not always a best determination of what actions should be taken, in what order. Still further, as the amount of network traffic increases, the number of documents requiring assistance increases and it becomes more and more difficult to provide such humanassisted delivery on a timely and cost-effective basis.

SUMMARY OF THE INVENTION

The present invention is a method for assisting delivery of a fax document from a source to a destination over a selected network, when one or more initial delivery attempts have been unsuccessful. The method includes notifying the sender of the unsuccessful delivery status of the fax document though an inquiry electronic mail (e-mail) message automatically generated by a process in the network. The message includes reasons for the unsuccessful delivery of the fax document and selectable options to facilitate delivery of the fax document. After selecting one or more desired options, the sender of the fax document returns an e-mail response to the network. Upon receiving the response, a network process evaluates and automatically initiates the selected options to facilitate delivery of the fax document.

In one embodiment, the e-mail message includes one or more suggestions for a "preferred method" to facilitate delivery. This reduces the burden on the source in selecting between the options.

The network will automatically decode and implement the return e-mail message from the sender. In this manner, the decoded e-mail message is used to automatically gather information required to facilitate delivery of a fax document, with no input from a human analyst. It is therefore more reliable, more accurate and less expensive than the prior art.

These and other features and benefits of the present invention will be more particularly described in regard to the following detailed description and figures.

BRIEF DESCRIPTION OF THE FIGURES

FIG. 3a is a representative example of an e-mail action report according to an embodiment of the present invention;

FIG. 3b is a representative example of a response to an e-mail action report according to an embodiment of the present invention;

DETAILED DESCRIPTION

Figure 1:
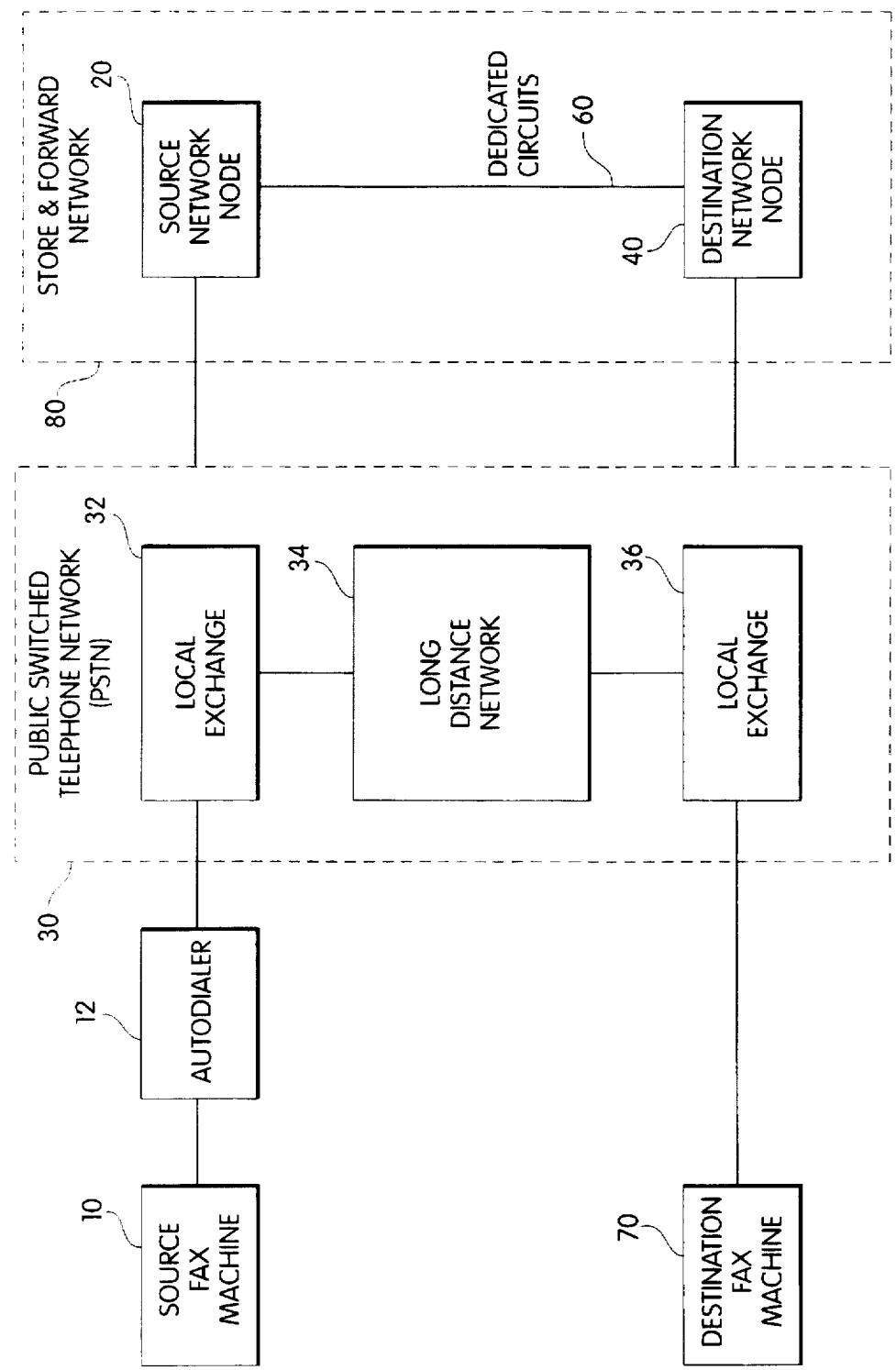
FIG. 1 is a schematic illustration of an S & F network disposed in parallel to a PSTN.

In accordance with one embodiment of the present invention, an action report (AR) e-mail process is provided to simplify and automate the process of gathering delivery instructions (DI) for completing the delivery of a fax document. The AR e-mail notifies the sender of the delivery status of a fax document and includes a request for alternate delivery instructions. The AR e-mail is sent automatically by the network to the sender of the fax document, and the network automatically decodes and follows the instructions in a responsive e-mail to complete delivery of the fax document.

As previously described (see FIG. 2), the delivery assist system (DAS) 56 maintains a database 59 which includes a list of destination fax numbers and a set of alternative delivery instructions for each (if available). The delivery expert system (DES) 57 relies upon this database to obtain alternative delivery information. When an undelivered document is directed to a number for which there are not sufficient delivery instructions, then the automated process of obtaining such delivery instructions begins.

In one embodiment, a document destined for a known fax number enters the S&F network through the autodialer. The document is not successfully delivered. The network now automatically checks to determine if alternate delivery instructions are available (e.g., in DAS database 59). If the delivery instruction status is incomplete for this destination, an AR e-mail is automatically prepared and sent to the sender of the fax document. The e-mail is generated by an AR process 55 (a software application) running on a processor at the central control facility 50, which is part of the S&F network and attached to the customer's PC 7 by a dedicated circuit 9 (discussed hereinafter with respect to FIG. 2). The appropriate e-mail address is extracted from a database accessible to the processor, which may form part of the DAS database 59. In this embodiment, a first AR e-mail is automatically prepared and sent out by the AR process to the sender of the fax document (customer's PC 7). The AR e-mail indicates the status of the fax document and reasons for non-delivery. In addition, the AR e-mail includes options from which the sender of the fax may choose to provide further instructions for a redelivery attempt, as well as suggestions for the most appropriate response. If no response is received, the document may be sent to the DAC 58 staffed by persons who will analyze the potential problem and attempt to obtain alternate means for delivering the fax (e.g., by telephoning a person at the destination).

To facilitate an understanding of the present invention, certain background information on S&F networks will first be provided. A known S&F network node contains the following four components:

1. Fax Transmit/Receive Agent (FTR)—As the name implies, this component is responsible for transmitting documents to and receiving documents from fax machines. This machine receives a fax document in an analog format from the PSTN and converts it to a digital format so that it can be transmitted efficiently and inexpensively over a packet network. An identical machine performs the converse transformation at the destination side of the network. This machine will also monitor the progress of a fax delivery attempt and determine reasons for failure, if any.

2. Traffic Administrator (TA)—This component is responsible for monitoring and controlling the movement of the fax document through the S&F network once it leaves the FTR. This is accomplished through the envelope mechanism, previously described.

3. File Server (FS)—This machine is responsible for receiving the fax document from the FTR and storing it until it is notified that the document has either been successfully delivered or canceled.

4. Router—This machine manages the flow of information between and among the other machines which make up the network node. Further, it formats data and manages its transport to other nodes on the network.

In normal operation, upon detecting a ring signal from the telephone network, the source FTR goes off-hook and exchanges information with the calling autodialer. Upon validating the call, it creates two files with unique names: a fax file to hold the incoming fax and a companion file called an envelope. A complete envelope file contains a variety of information generally including the source fax machine number, the destination fax number, the number of pages in the document and the total reception time; that is, all the information required to deliver the fax and bill the customer. Once the files are created, the FTR instructs the autodialer to allow it to interact directly with the source fax machine to initiate the fax reception process. It then begins to receive the fax data and store it in a local buffer under the created filename. Once reception is complete and the call terminated, the FTR transfers the fax file to the file server and then forwards the related envelope file to the source TA to begin the file routing process. Note that all this activity takes place within the source node.

The delivery process begins with an examination of the envelope to determine the document destination. The source TA decides upon an appropriate route and forwards the envelope to a selected destination TA. From there, the envelope is relayed to a destination FTR to begin the delivery process. After retrieving the entire fax document from the source file server, the destination FTR dials the destination fax number to commence delivery.

Figure 2:
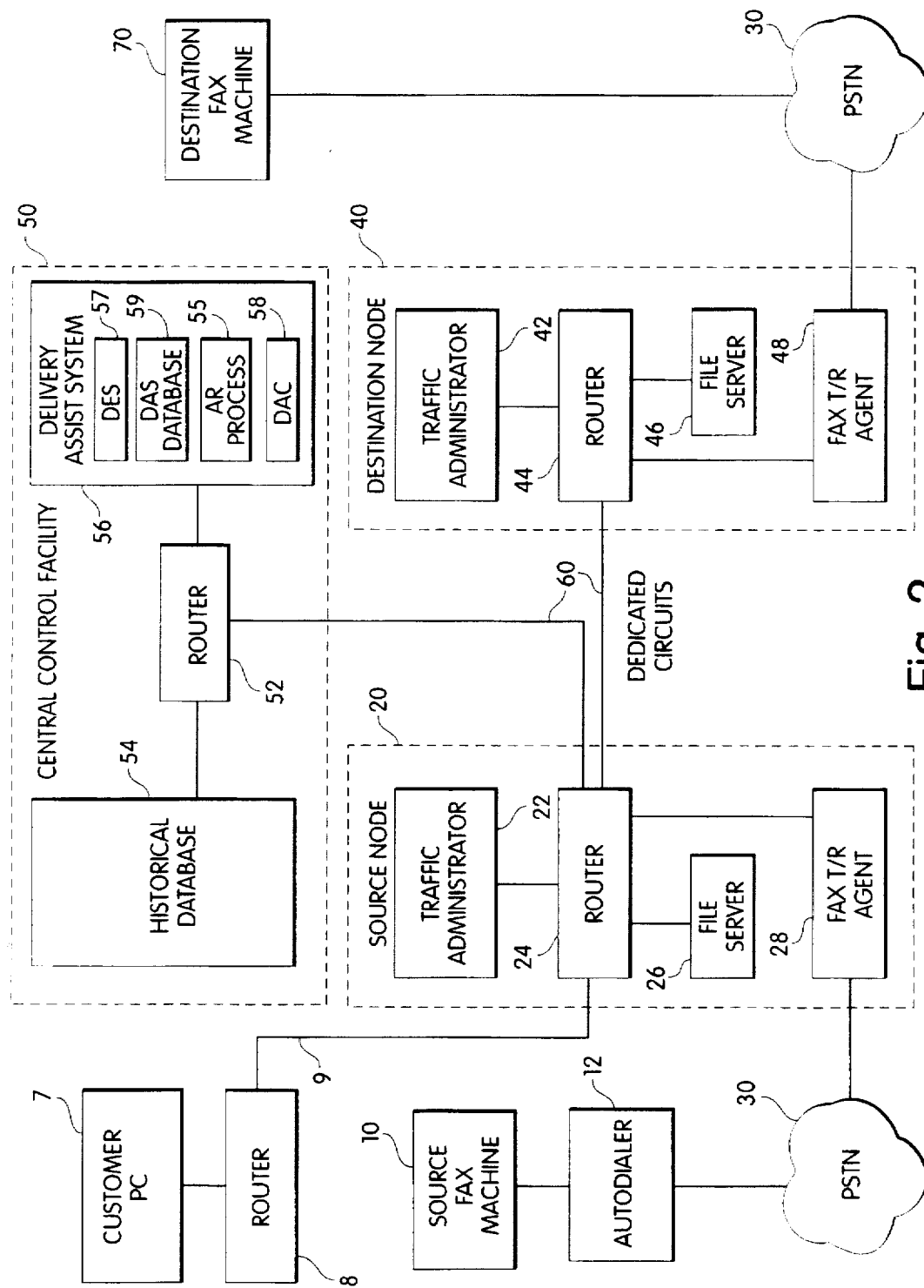
FIG. 2 is a schematic illustration of an apparatus for obtaining further delivery instructions according to the present invention.

The following is a more detailed description of an apparatus and method for delivering a fax document in the S&F network (see FIGS. 1 and 2). In addition to the major components illustrated in FIG. 1, a Central Control Facility 50 is shown in FIG. 2 which is operated by the S&F network provider and which communicates via router 52 on dedicated circuits 60 with the source and destination nodes 20, 40 via routers 24, 44 respectively. Central Control is also able to communicate with the customer PC 7 via routers 8, 24 and 52, and dedicated circuits 9 and 60. The automatic method of requesting, obtaining and using alternate delivery instructions via e-mail according to the present invention is incorporated into this general method and apparatus beginning at step 20.

1. The customer loads a document into his fax machine 10 and dials the destination fax number.
2. The autodialer 12 attached to the customer's fax machine screens the dialed number. If it detects a valid destination phone number, it dials the network provider number (i.e., the telephone number of the source network node 20). The Public Switched Telephone Network (PSTN) 30 transfers the call to an FTR 28 at the source node.
3. The source FTR 28 answers and sends out a sequence of Dual Tone Multi Frequency (DTMF) tones on the PSTN 30 to indicate its presence.
4. The autodialer 12 responds with a string of DTMF tones which indicate, among other information, an identifier of the source fax machine 10 (to which it is attached) and the destination fax number.
5. The source FTR 28 validates the received data and acknowledges its receipt with another DTMF signal to the autodialer 12.
6. The autodialer 12 then removes itself from the circuit and the fax session progresses as if the customer's fax machine 10 is connected directly to the destination fax machine 70. In reality, the customer's fax document is entering the S&F network for delivery.
7. When the source FTR 28 receives the fax, it creates a small data file called an envelope to contain information about the fax document. The envelope includes the following information:

document number (assigned by the source FTR);

source fax machine identifier;

destination fax machine telephone number;

customer number.

8. After reception is complete, FTR 28 transfers responsibility for the document. The fax document is transferred to the source File Server (FS) 26. The envelope is transferred to the source Traffic Administrator (TA) 22.
9. Once the source FTR 28 receives notification that the fax document and the envelope were transferred successfully, it deletes the fax document from its database.
10. To initiate the delivery process, the source TA 22 sends the envelope to the destination TA 42. The envelope residing on the destination TA 42 is known as the destination envelope.
11. The destination TA 42 transfers the destination envelope to the least loaded destination FTR 48.
12. Upon receipt of the destination envelope, the destination FTR 48 retrieves a copy of the document from the source FS 26. The fax document is now ready for delivery.
13. In addition, the destination FTR 48 creates a document status update (DSU) containing detailed information about the status of the fax document it is holding for delivery. The destination FTR 48 sends the updates to the destination TA 42 at regular (e.g., two-minute) intervals.
14. The destination TA 42 forwards the DSU to the source TA 22.
15. The source TA 22 uses the information in the DSU to update its copy of the fax envelope.
16. The destination FTR 48 attempts to deliver the document by calling the destination fax machine 70 through the destination country's PSTN 30. The result of the attempt is either:

Successfully Delivery—The document was delivered to the destination fax machine 70.

Failed Attempt—The document was not delivered to the destination fax machine 70 because of one of the following conditions:
   Busy Line
   No Answer
   Nonworking number
   Disconnected line
   Broken Connection (including one of several types)
   Non-Fax (for example, voice detected)
   Other (a general term assigned to a number of telephony or faxing errors).

17. If the document is successfully delivered, the destination FTR 48 updates the DSU with the final delivery information and returns it to the destination TA 42, which in turn forwards it to the source TA 22. The envelope is then updated with the new information and transferred to the historical database (HD) 54 for archival storage. At some later time, the information will be retrieved from the system to compute a customer bill. As a final task, the source TA 22 sends a request to the FS 26 to delete the file corresponding to the delivered document.
18. If the document is not successfully delivered on the first attempt, the destination FTR 48 makes additional delivery attempts at regular intervals over some predetermined time period—usually every five minutes for a half hour. At each failure, the delivery attempt time and reason for the failure is noted in the appropriate DSU. If all delivery attempts are futile, the destination FTR 48 declares the document as "Not Delivered," suitably marks the DSU, and sends it to the destination TA 42 for return to the source TA 22.

19. Noting that the document has not been delivered, the source TA 22 forwards the envelope to the Delivery Assist System (DAS) 56 for resolution. The Delivery Expert System (DES) 57 will review the delivery attempt history contained in the envelope and determine a course of action. It may, for example, determine that sending the fax to an alternative destination number is the best strategy for success. It will then peruse its associated database 59 for the required information. If an alternate number is found, it is inserted into the envelope which is then resubmitted to the source TA 22 for standard delivery.

20. In the event that no alternative number is available, an electronic mail (e-mail) message is automatically generated by the AR process 55 with the appropriate e-mail address retrieved from database 59, and the e-mail message sent, via dedicated circuit 9, to customer PC 7 (the sender of the document). The message includes a notification of a non-delivered status, reasons why the document was not delivered, selectable options for redelivery, and a suggestion as to which option is most appropriate under the circumstances (e.g., request for an alternative delivery number).

21. The sender of the document selects one or more options and returns a responsive e-mail with the selected options, via router 8, dedicated circuit 9 and router 24, to the DAS. The options may include resubmitting the document to the same number, providing a corrected or new phone number, rescheduling delivery at a later specified time, canceling the document, or otherwise as the circumstances warrant.

22. The AR process 55 decodes the selected options and automatically uses the information to define the delivery strategy. Where appropriate, the new information is incorporated into the DES database 59.

23. If the network fails to deliver the document with the new information, it is referred once again to DES for further processing. When DES determines that it has exhausted all of its options, it refers the problem to a Delivery Analyst (human operator) for resolution. The Delivery Analyst may call the source or destination of the document for more information, or take other action as is deemed appropriate to facilitate delivery of the document.

FIG. 3a is representative of the electronic mail message 101 automatically generated by the AR process 55 and sent to the sender of the fax document. The message includes a notification of the status of the document 102, reasons why the document was not delivered 103, selectable options for redelivery 104, and a suggestion as to the most appropriate response 105.

FIG. 3b is representative of the electronic mail message response 102 generated by the sender of the fax document. The response message contains selected options 106 which give instructions for redelivery of the document. The message in FIG. 3b is received by DAS 56 which automatically processes the options, allowing the network to renew a delivery attempt (or take some other appropriate action).

Figure 4:
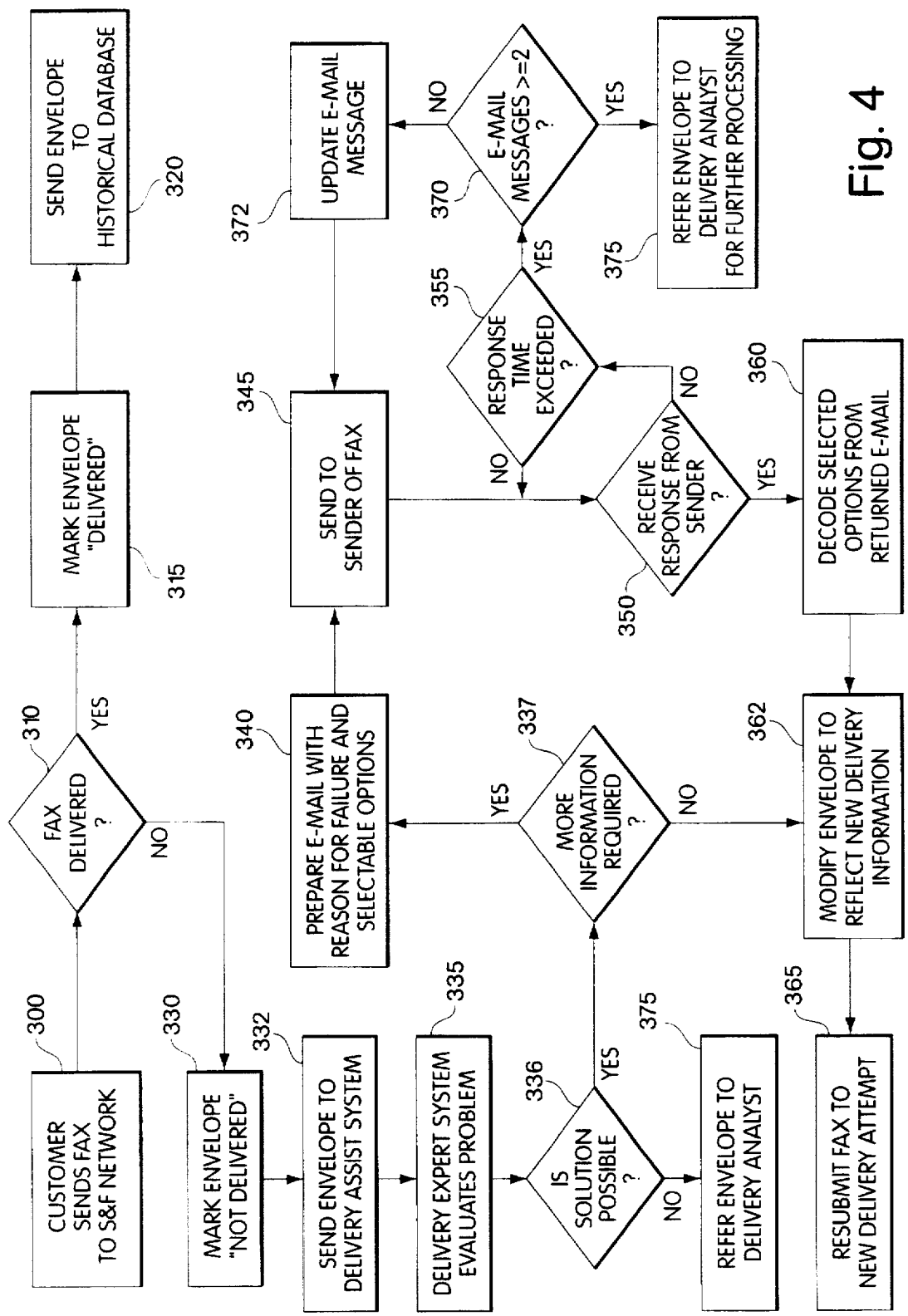
FIG. 4 is a flow chart describing the method of one embodiment of the present invention.

FIG. 4 is a flowchart illustrating the e-mail request/response method steps according to one embodiment of the present invention. The process begins with a customer submitting a fax to the S&F network, step 300. Step 310 determines whether delivery of the fax was successful. If it was, then the envelope associated with the fax is marked "delivered" (step 315) and sent to the historical database (step 320) where the process ends. If the fax was not delivered successfully, the envelope associated with the fax is marked "not delivered" (step 330) and sent to the DAS for resolution (step 332).

All incoming envelopes are assigned by DAS to the delivery expert system (DES) for evaluation (step 335). If at any time DES is unable to determine a course of action (step 336), it passes the problem to a human attendant, a Document Delivery Analyst, for further analysis (step 375). First, DES consults its database to determine if it has sufficient information to solve the problem (step 337); if yes, it modifies the envelope (step 362) and resubmits it to the network (step 365) for a new delivery attempt. If DES does not have sufficient information to solve the problem, the AR process automatically prepares an e-mail outlining the reasons for the non-delivered status of the fax (step 340). The e-mail also contains selectable options outlining instructions which may assist in the delivery of the fax. In step 345, the e-mail is sent to the sender of the fax.

If the AR process is unable to implement an e-mail message for any reason (step 336), the delivery problem is relayed to a human operator, a delivery analyst, for resolution.

In step 350, DAS checks to determine if a response to its e-mail has been received. If not, it determines if the maximum response time has elapsed (step 355) and, if not, it again checks for a response from the sender. If the response time has been exceeded, DAS determines how many messages have been sent to the sender (step 370); if, as in this case, it is less than two, the original message is updated (step 372) and sent once again to the sender. In contrast, if the number of messages sent is greater than or equal to two, further automatic attempts to reach the sender are terminated and the undelivered message referred to a delivery analyst for processing, step 375.

Referring back to step 355, if the response time is not exceeded and DAS receives a response in the form of a return e-mail from the sender of the fax (step 350), then the AR process decodes the e-mail response (step 360). The decoding (step 360) allows the AR process to read the options which have been selected by the sender of the fax and to automatically use the instructions contained in the selected options. The fax is then automatically resubmitted to the network based on the instructions in the decoded options (step 365) and the process starts again (step 310).

The resubmitted fax is sent through the network, and any difficulties are resolved as detailed above. This e-mail system of sending and receiving modifiable action reports ensures that any undelivered fax is successfully delivered in a faster, more reliable, less-expensive and more automated method. The network is able to automatically resolve more problems of undelivered documents, and fewer delivery analysts (human operators) are needed.

The above-described embodiments may be implemented with a variety of hardware and/or software configurations. The functionality of the principal network components can be achieved in software applications executing on standard PC platforms. The autodialer may be implemented as a stand-alone programmable device using specially designed hardware or completely in software on a PC which may also utilize a fax modem or other communication device. The choice of whether to use a few or many machines is dependent upon the amount of traffic carried as well as the desired system reliability and redundancy. Note also that the automatic messaging system is not limited to e-mail; automated voice messaging systems may be similarly employed as well.

Figure 5:
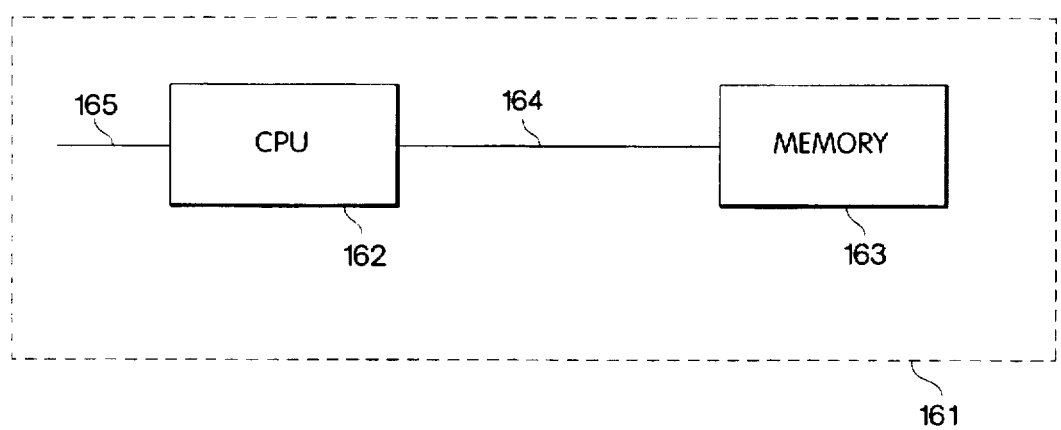
FIG. 5 is a block diagram illustrating a central processing unit and memory for use in this invention.

Various features of the invention may be implemented using a general purpose computer 161 as shown in FIG. 5. The general purpose computer may include a computer processing unit (CPU) 162, memory 163, a processing bus 164 by which the CPU can access the memory, and interface 165 to the network.

The invention may be a memory, such as a floppy disk, compact disc, or hard drive, which contains a computer program or data structure, for providing to a general purpose computer instructions and data for carrying out the functions of the specific embodiment.

In other embodiments, the source fax machine 10 may be for example a desktop computer having a fax modem which connects to an autodialer, or a fax server connected to one or more autodialers (for example servicing a plurality of computers on a local area network). The software residing on the desktop computer or fax server will include the local database of validated fax numbers. Thus, as used herein, "fax machine" includes a desktop computer, fax server or other source of fax documents.

These and other modifications and improvements of the present invention will be understood by a person skilled in the art and are intended to be included within the scope of the claimed invention.

We claim:

1. A method for assisting delivery of a fax document from a source to a destination over a network, when an initial delivery attempt has been unsuccessful, comprising the steps of:

generating an inquiry electronic mail (e-mail) message automatically, the inquiry e-mail message indicating the unsuccessful delivery status of the fax document and comprising selectable options with instructions for a new attempt to deliver the fax document;

sending the inquiry e-mail message to the source of the fax document;

waiting for a response e-mail from the source of the fax document, the response e-mail including selected options;

upon receipt of the response e-mail from the source, the network performing the selected options automatically to facilitate delivery of the fax document.

2. The method of claim 1, wherein the inquiry e-mail message includes a reason for the unsuccessful delivery status of the fax document.

3. The method of claim 1, wherein the inquiry e-mail message includes a suggestion for selecting from the selectable options.

4. The method of claim 1, wherein an e-mail address used for sending the inquiry e-mail message is extracted from a database of source e-mail addresses.

5. The method of claim 1, wherein after receipt of the response e-mail, information from the selected options is incorporated into a delivery information database.

6. The method of claim 1, wherein the instructions include attempting delivery of the fax document to an original destination number at a later time.

7. The method of claim 1, wherein the instructions include attempting delivery of the fax document to a new destination number.

8. The method of claim 1, wherein the instructions include rescheduling delivery at a later time.

9. An automated fax document delivery system for facilitating delivery of a fax document from a source to a destination in a network comprising:

means for automatically generating an inquiry electronic mail (e-mail) message and sending the message to a source of a fax document, the inquiry e-mail message indicating an unsuccessful delivery status of the fax document and including a plurality of selectable options with instructions for a new attempt to deliver the fax document;

means for receiving a response e-mail message from the source of the fax document, the response e-mail message containing selected options; and means for automatically decoding the selected options and attempting delivery of the fax document based on the selected options.

10. The system of claim 9, wherein the means for generating the inquiry e-mail message is an action report process having access to a database of source e-mail addresses.

11. The system of claim 9, wherein the inquiry e-mail message includes a reason for the unsuccessful delivery status.

12. The system of claim 9, wherein the inquiry e-mail message includes suggestions for selecting from the selectable options.

13. The system of claim 9, wherein the instructions include attempting delivery of the fax document to an original destination number at a later time.

14. The system of claim 9, wherein the instructions include attempting delivery of the fax document to a new destination number.

15. The system of claim 9, wherein the instructions include rescheduling delivery at a later time.

16. The system of claim 9, further including a delivery database for storing the instructions contained in the response e-mail message.

* * * * *